(12) United States Patent
Guy et al.

(10) Patent No.: US 11,629,078 B1
(45) Date of Patent: Apr. 18, 2023

(54) FREE CHLORINE MAINTAINED SYSTEMS

(71) Applicant: King Technology Inc., Hopkins, MN (US)

(72) Inventors: David Guy, Maple Grove, MN (US); Jeffrey D. Johnson, Edina, MN (US); Paul Freeberg, South St. Paul, MN (US); Terry Goeman, Minnetonka, MN (US); Lyle Enderson, Elk River, MN (US); Joseph A King, Wayzata, MN (US); Randy Roseth, Chanhassen, MN (US)

(73) Assignee: KING TECHNOLOGY, INC., Minnetonka, MN (US)

( * ) Notice: Subject to any disclaimer, the term of this patent is extended or adjusted under 35 U.S.C. 154(b) by 120 days.

(21) Appl. No.: 17/300,204

(22) Filed: Apr. 12, 2021

Related U.S. Application Data

(62) Division of application No. 16/602,276, filed on Sep. 5, 2019, now Pat. No. 11,203,539.

(60) Provisional application No. 62/765,681, filed on Sep. 7, 2018.

(51) Int. Cl.
   C02F 1/68 (2023.01)
   C02F 1/76 (2023.01)

(52) U.S. Cl.
   CPC .............. *C02F 1/685* (2013.01); *C02F 1/76* (2013.01)

(58) Field of Classification Search
   CPC .................................. C02F 1/685; C02F 1/76
   See application file for complete search history.

(56) References Cited

U.S. PATENT DOCUMENTS 5,565,109 A * 10/1996 Sweeny ............... A01N 59/00
                                                    210/764

* cited by examiner

*Primary Examiner* — Lessanework Seifu
(74) *Attorney, Agent, or Firm* — Johnson & Phung LLC

(57) ABSTRACT

A method of maintaining a safe free chlorine level in a body of water for recreational use where the free chlorine level at a harmful level comprises determining if the free chlorine level in the body of water is above a safe level and adding sufficient DMH to the body of water to bring the free chlorine down to a safe level.

4 Claims, 10 Drawing Sheets

FIG. 1

| Date | Time | Measured Total CL [ppm] | Measured Free CL [ppm] | Calculated Combined CL [ppm] | pH | Measured TA [ppm] | Measured Temp [°F] | Chemical Additions Dichlor | Chemical Additions pH Down [g] | Notes |
|---|---|---|---|---|---|---|---|---|---|---|
| 4/26 | 7:00AM | | | | | | | 8 | 600 | 1 |
| 4/26 | 11:15AM | 1 | 0.84 | 0.16 | 8.1 | 110 | | | 35 | 2 |
| 4/27 | 7:15AM | 0.52 | 0.4 | 0.12 | 8.2 | 110 | 86.7 | 1.6 | 40 | |
| 5/2 | 1:30PM | 0.37 | 0.26 | 0.11 | 8.3 | 110 | | 2 | 40 | |
| 5/3 | 7:29AM | 1.17 | 0.99 | 0.18 | 7.5 | | | | | |
| 5/3 | 9:45AM | 1.14 | 0.93 | 0.21 | 7.5 | 100 | 84.9 | | | 3 |
| 5/3 | 10:48AM | 1.59 | 0.08 | 0.51 | 7.4 | 90 | 84.7 | | | |
| 5/3 | 11:48AM | 0.52 | 0.08 | 0.44 | 7.4 | 90 | 84.6 | 27 | | |
| 5/4 | 7:27AM | 9.2 | 8.36 | 0.84 | 7.5 | | 84.4 | | | 4 |
| 5/4 | 10:04AM | 8.94 | 0.54 | 8.4 | 7.5 | 90 | 84 | | 20 | |
| 5/5 | 8:54AM | 8.66 | 0.5 | 8.16 | 7.6 | | 84.2 | | | |
| 5/5 | 9:47AM | 8.56 | 0.72 | 7.84 | 7.3 | 90 | 84.2 | | | |
| 5/5 | 10:48AM | 8.4 | 0.66 | 7.74 | 7.3 | 90 | 84.2 | | | |
| 5/5 | 12:17PM | 7.88 | 0.52 | 7.26 | 7.2 | 90 | 83.8 | | | 5 |
| 5/5 | 1:16 PM | 7.62 | 0.59 | 7.03 | 7.2 | 90 | | | | |

Notes 1. 4/26 Filled spa with partially-bypassed water softener. Set temperature for 85 degrees. Ran jets for 20minutes to aid in lowering the TA while maintaining the pH
2. 4/26 Measured 170 ppm Calcium Hardness
3. 5/3 From 10:03am to 10:18am there were 3 bathers in the spa (DG, JJ, LE)
4. 5/4 Added 76 grams (50 ppm) of DMH after sampling
5. 5/5 Three bathers, 15 minutes each, between 11:15 and 11:45 (GG, JJ, LE)

FIG. 4

| Date | Time | Measured | | | Calculated | Measured | | Calculated | Chemical Additions | | | Notes |
|---|---|---|---|---|---|---|---|---|---|---|---|---|
| | | Total CL [ppm] | Free CL [ppm] | | Combined | pH | TA [ppm] | DMH [ppm] | DMH [g] | Dichlor [g] | pH Down [g] | |
| 5/5 | 8:00AM | | | | | | | | | 30 | 500 | 1 |
| 5/6 | 7:02AM | 8.58 | 7.89 | | 0.69 | 7.6 | 130 | 0 | | 3 | 15 | 2 |
| 5/6 | 7:38AM | 9.87 | 9.45 | | 0.42 | 7.4 | 130 | 0 | | 3 | 40 | 3 |
| 5/6 | 8:10AM | 10.68 | 10.35 | | 0.33 | 7.6 | 120 | 0 | 5.7 | | | 4 |
| 5/6 | 8:45AM | 10.29 | 7.08 | | 3.21 | 7.6 | | 5 | 5.7 | | | |
| 5/6 | 9:14AM | 9.87 | 4.41 | | 5.46 | 7.6 | | 10 | 5.7 | | | 5 |
| 5/6 | 9:55AM | 9.66 | 1.82 | | 7.84 | 7.6 | | 15 | 5.7 | | | |
| 5/6 | 10:25AM | 9.39 | 0.82 | | 8.57 | 7.6 | | 20 | 5.7 | | | |
| 5/6 | 10:53AM | 9.08 | 0.67 | | 8.36 | 7.6 | | 25 | 5.7 | | | |
| 5/6 | 11:28AM | 9.45 | 0.54 | | 8.91 | 7.6 | | 30 | 5.7 | | | |
| 5/6 | 11:54AM | 9.3 | 0.53 | | 8.77 | 7.6 | | 35 | 17.1 | | | |
| 5/6 | 12:27PM | 9.33 | 0.47 | | 8.86 | 7.7 | | 50 | 57 | | | |
| 5/6 | 12:57PM | 9.3 | 0.52 | | 8.78 | 7.7 | | 100 | 114 | | | |
| 5/6 | 1:28PM | 9.21 | 0.55 | | 8.65 | 7.7 | | 200 | | | | |

Notes
1. Filled spa with partially-bypassed water softener. Set temperature for 85 degrees.
2. Temperature = 85.5
3. Aerated to support pH during TA reduction
4. Temperature = 85.6
5. Forgot to add DMH right away, additional time needed before next sample

FREE CHLORINE MAINTAINED SYSTEMS

CROSS REFERENCE TO RELATED APPLICATIONS

This application is a division of SN/602,276 filed Sep. 5, 2019 which claims priority from provisional application Ser. 62/765,681 filed Sep. 17, 2018.

STATEMENT REGARDING FEDERALLY SPONSORED RESEARCH OR DEVELOPMENT

None

REFERENCE TO A MICROFICHE APPENDIX

None

BACKGROUND OF THE INVENTION

One of the difficulties in using chlorine for maintaining a body of recreational water at a person friendly condition i.e. such as a pool or hot tub, is that if the free chlorine level is too high it can be harmful to the persons in the body of recreational water. On the other hand if the free chlorine level is too low the pathogens in the body of recreational water can be harmful to the persons in the body of recreational water. Typically, chlorine is continually added to a body of water such as pool or spa in a variety ways, for example through a floating dispenser or an inline dispenser that contains chlorine in a solid form. In these types of dispensers the rate of delivery of chlorine is manually set to accommodate an expected load on the pool and is periodically adjusted based on tests on the amount of chlorine in the water. One of the difficulties with free chlorine maintenance in a system is the need to maintain the body of water in a person friendly condition even though the body of water is subject to periodic bather loads, which consumes available free chlorine and therefore lessens the capacity of the system to rid the body of water of harmful pathogens. Consequently, to maintain a body of recreational water in a person friendly condition usually requires adding additional chlorine to the body of water to replace the free chlorine consumed in ridding the water of harmful pathogens. Various methods are used to maintain an acceptable level of free chlorine in the body of water as the demand for free chlorine varies in response to a bather load. One method uses electrolytic cells that generate additional chlorine. Another method uses dispensers that can be adjusted to dispense additional chlorine into the body of water in response to an increased bather load while still other methods may supplement the free chlorine with other chemicals or metallic ions to maintain the body of recreational water at a person friendly condition i.e. where the free chlorine in the body of water continues to rid the water of harmful pathogens even though the body of recreational water is subject to a periodic bather load. Typically, such systems require the pool owner to manually adjust the chlorine-dispensing rate before and after pool events if the pool owner wants to maintain the body of water in a person friendly condition.

SUMMARY OF THE INVENTION

A free chlorine maintained system and a method of maintaining a free chlorine level in a body of water as the free chlorine is consumed with the invention further including a free chlorine maintainer, which is self-regulating, for maintaining a free chlorine level in a body of recreational water for human immersion with the free chlorine level in the body of water maintained at sufficiently low concentration to avoid chlorine harm to a person in the body of water and at sufficiently high concentration to control the pathogens in the body of recreational water at a safe level for human immersion even though the body of water is subject to periodic bather loads. It has been found that the addition of 5, 5-dimethyl-hydantoin (DMH), which is classified as an inert product since it contains no antimicrobial properties, produces a self-correcting effect in response to increased chlorine requirements caused by periodic bather loads on a pool. While not fully understood it is believed the system temporarily neutralizes chlorine being dispensed to the pool when the chlorine demand in the pool is normal and releases the neutralized chlorine in the form of free chlorine in response to an abnormal chlorine load to thereby eliminate the need to periodically add additional chlorine to the body of water in response to a periodic bather loads. A further feature of the invention is that when the DMH is used in an outdoor pool the DMH can be accompanied by an algaecide to further maintain the pool free of algae in response to periodic bather loads. In order to maintain the self-correcting effect in response to periodic bather loads DMH is periodically added to the body of water.

BRIEF DESCRIPTION OF THE DRAWINGS

FIG. 2A is a graph of the free chlorine in the 400-gallon Hot Springs Vanguard spa as a function of time with the spa having been subjected to a bather load and with the spa water containing 5,5-dimethyl-hydantoin (DMH) and free chlorine obtained from Sodium Dichloroisocyanurate-dihydrate;

FIG. 3A is a graph of the free chlorine and total chlorine in the 400-gallon Hot Springs Vanguard spa as a function of time with the spa having been subjected to a bather load with the water in the spa containing both Sodium Dichloroisocyanurate-dihydrate and DMH;

DESCRIPTION OF THE PREFERRED EMBODIMENT

Figure 1:
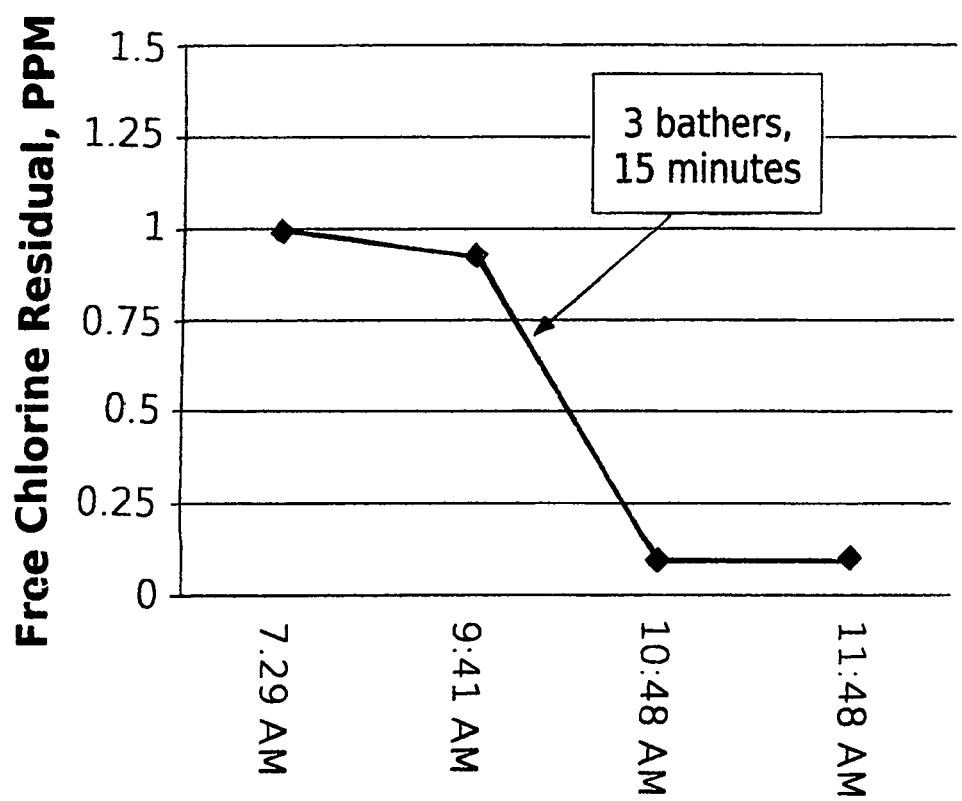
FIG. 1 is a table of the chlorine content in a 400-gallon Hot Springs Vanguard spa containing tap water and chlorine where the chlorine is obtained from Sodium Dichloroisocyanurate-dihydrate (Dichlor) and the pH of the water has been adjusted by adding pH down (sodium Bisulfate) to the tap water.

A free chlorine maintainable system, which is self-regulating, for maintaining a free chlorine level in the body of recreational water sufficiently low to avoid chlorine harm to a person in the body of water and sufficiently high to control the pathogens in the body of water at a safe level when the body of water is subject to periodic bather loads while minimizing or eliminating the need to supply additional disinfectants to the body of water in response to the periodic bather loads. A body of recreational water as used herein, although not limited to, is understood to comprise a body of water such as a pool, a spa a hot tub or the like in which a person wholly or partially immerses himself or herself. While the invention described herein is suitable for use in various bodies of water it is well suited for seasonal outdoor pools where the chlorine needs of the outdoor pool can vary for a variety of reasons including bather load and environmental loads.

It has been found that a free chlorine maintained system of recreational water using a free chlorine maintainer consisting of chlorine and dimethylhydantoin (DMH) while the physical conditions of the recreational water such as the temperature, the alkalinity and the pH are kept within limits acceptable for recreational use can maintain the body of recreational water in a safe condition for recreational uses. The free chlorine maintained system allows the free chlorine in the body of water to attack the pathogens from the bather load while also preventing the free chlorine level in the body of water from dropping to an unsafe level, typically less than 0.5 to 0.1 ppm.

The inventions includes multiple ways of obtaining a water system that avoids the drop off in free chlorine levels when the water is subjected to a bather load. In order to provide examples of the invention a first test (chlorine without DMH) was conducted to show the free chlorine level in a body of water, which was subjected to a bather load. A second test (chlorine with DMH) was conducted to show the response of the free chlorine level in a body of water, which was subjected to a similar bather load when both chlorine and DMH are present in the body of water.

Example 1 (Chlorine without the Use of DMH)

The container for the body of recreational water was a 400-gallon Hot Springs® Vanguard® brand spa. The procedure for preparing test water was as follows:

1) Fill container with fresh tap water, with softener partially bypassed to give approximately 200 parts per million of calcium hardness. Measure and record calcium hardness.
2) Adjust temperature setting to 85 degrees Fahrenheit.
3) Add Sodium Bisulfate "pH Down" to adjust alkalinity into the 80-120 ppm range.
4) Add Sodium Dichloroisocyanurate dihydrate "dichlor" to overcome the initial chlorine demand of the water.
5) After 1 day, adjust pH into the 7.2 to 7.8 range by running the jets.
6) Measure & record temperature For the test with dichlor the procedure was as follows:
1) Adjust free chlorine residual into the 0.5 to 1.0 ppm range.
2) Measure and record chlorine residuals, pH, and total alkalinity
3) Have 2-4 bathers sit in the spa for 15-20 minutes. Record # of bathers and time.
4) Allow 30 minutes to pass, then measure and record chlorine residuals.
5) Allow 1 more hour to pass, then measure and record chlorine residuals.

The container was filled with fresh tap water, with softener partially bypassed and tested using a Taylor® kit K-2006 Calcium Hardness drop test which measured water hardness of approximately 200 parts per million of calcium hardness.

The total Alkalinity of the recreational water was measured using a Taylor® kit K-2006 Alkalinity drop test. To adjust the total alkalinity levels of the water to the 80-120 ppm range 95% Sodium Bisulfate (pH Down) was added to the water. The 95% Sodium Bisulfate, which was added to the body of recreational water, was obtained from Great Lakes Biochemicals®. To add chlorine to the body of recreational water in the containers 99% Sodium Dichloroisocyanurate dihydrate (dichlor) was added to the water. The 99% Sodium Dichloroisocyanurate dihydrate was obtained from Great Lakes Biochemicals®, and applied to the body of water to overcome the initial sanitizing chlorine demand of the water in the container. As used herein the term Dichlor refers to Dichloroisocyanurate dihydrate and the term DMH refers to 5-5 dimethylhydantoin while the reference in ppm is to parts per million by weight.

The water temperature in the container was measured using a Thermoworks® Superfast Digital Thermometer and the water in the container was maintained at about 85° F. The water in the containers was allowed to stabilize for a day after which the pH levels of the water in the container was measured using an Oakton® EcoTestr® pH2 meter. To adjust the pH level in the body of water the pH jets in each of the containers were run until the pH level in each of the containers was within the range of 7.2 to 7.8.

FIG. 1 shows a table of the results of the test (with and without DMH) where the free chlorine, the total chlorine, the pH, the total alkalinity and the temperature were measured after 400-gallon Hot Springs® Vanguard® brand spa and pH down had been added to the spa water in a 400-gallon Hot Springs® Vanguard® brand spa.

Figure 2:
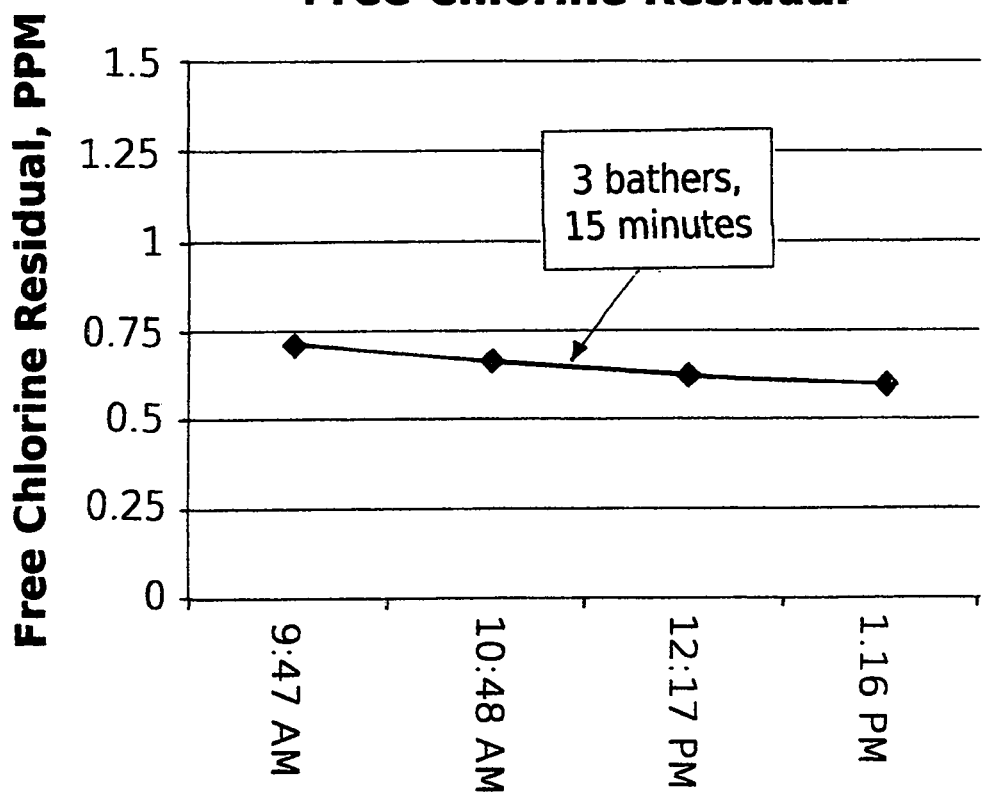
FIG. 2 is a graph of the free chlorine in the 400-gallon Hot Springs Vanguard spa as a function of time with the spa having been subjected to a bather load and with the free chlorine in the water obtained from Sodium Dichloroisocyanurate-dihydrate.

FIG. 2 shows a graph of the free chlorine as a function of time with the 400-gallon Hot Springs® Vanguard® brand spa (without DMH) which contains Dichlor as the spa water is subjected to a bather load. As can be seen the level of free chlorine declines from 1 ppm to about 0.1 ppm in response to the bather load.

FIG. 2A shows a graph of the free chlorine as a function of time with the 400-gallon Hot Springs® Vanguard® brand spa which contains Dichlor and DMH as the spa water is subjected to a bather load. As can be seen the level of free chlorine remains in a range of about 0.7 ppm to 0.6 ppm in response to the bather load.

Figure 3:
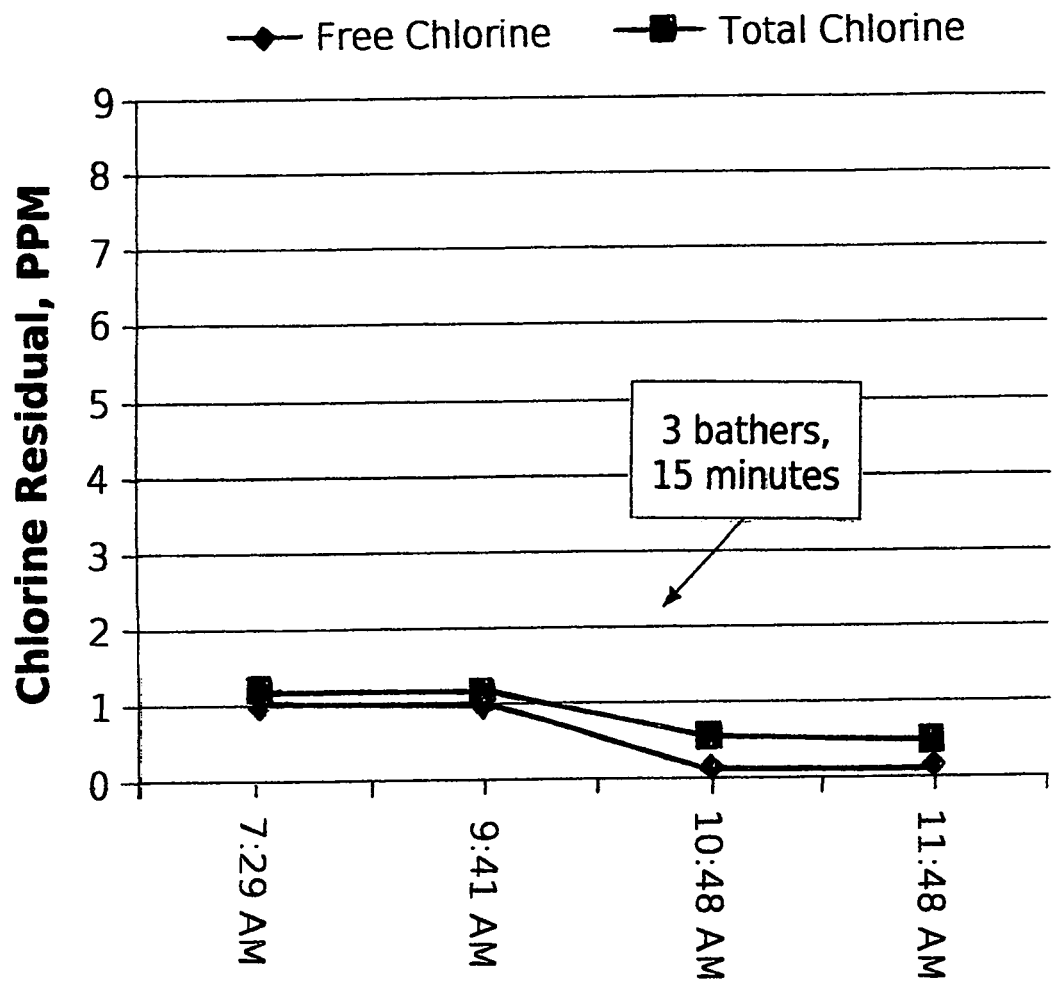
FIG. 3 is a graph of the free chlorine in the 400-gallon Hot Springs Vanguard spa as a function of time with the spa having been subjected to a bather load with the water in the spa containing Sodium Dichloroisocyanurate-dihydrate but no DMH.

FIG. 3 shows a graph of the free chlorine and the total chlorine as a function of time with the 400-gallon Hot Springs® Vanguard® brand spa which contains Dichlor and no DMH as the spa water is subject to a bather load that creates an immediate need for free chlorine to neutralize the effects of bathers in the pool. As can be seen the level of both the free chlorine and the total chlorine declines with the free chlorine declining to 0 ppm while the total chlorine declines from 1.0 ppm to about 0.5 ppm in response to the bather load. The reference to ppm used herein is in reference to ppm by weight.

FIG. 3A shows a graph of the free chlorine and the total chlorine as a function of time with the 400-gallon Hot Springs® Vanguard® brand spa where the spa water contains chlorine introduced through the addition of Dichlor and DMH as the spa water is subject to a bather load. As can be seen the level of the free chlorine remains between 1.0 ppm and 0.5 ppm when the spa water is subject to the bather load while the total chlorine declines from about 8.5 to about 7.5 as the spa water is subject to the bather load.

Thus the invention described herein in one example comprise a method of maintaining the free chlorine in a body of water for human immersion between 0.5 ppm and 1 ppm when subject to a bather load that decreases the free chlorine available in the pool. In this mode the invention comprises the steps of adding a chlorinating agent to overcome the initial sanitizing chlorine demand of the body of water and maintaining a temperature of the body of water between degrees 70° F. to 104° F. If needed one can adjust the alkalinity of the body of water to between 80 ppm and 120 ppm by adding sodium bisulfate. Preferably one should maintain the pH in the body of water in the range of 72 to 7.8. With the above methods one can add chlorine to the body of water to bring the total chlorine level in the body of water to between 1-20 ppm. In this example it has been found that if one adds DMH to the body of water one can bring the level of free chlorine to about 1 ppm as the addition of DMH has been found to lower the measurable free chlorine until a stable or equilibrium state of about 1.0 ppm is obtained. Once the initial chlorine conditions of the pool are established a maintenance amount of chlorine can be continually or intermittingly added to the body of water through a dispenser or the like to maintain the body of water in the initial condition for human recreational use. Typically, the rate of release of chlorine is manually selected on either an inline dispenser or an in water dispenser in order to maintain a free chlorine base (typically 0.5 ppm to 1.0 ppm free chlorine) in the body of water sufficient to maintain the pool suitable for use by bathers. With the above-described chlorine base water condition maintained through a dispenser, which is not responsive to a bather load it has been found that with the presence of DMH and chlorine in the body of water one can subject the body of water to a normal bather load, which although the bather load spikes the need for free chlorine the use of DMH and chlorine prevents the free chlorine level dropping to an unacceptable level. That is, it has been found that while the bather load absorbs free chlorine in the body of water, with the presence of DMH the level of free chlorine is prevented from decreasing to less than 0.5 ppm. A normal bather load as described herein is bather use that is unique to a particular pool use and may be different for another pool. For example, some pools may have two persons using the pool on a regular basis while other pools may have six or seven people using the pool on a regular basis. In each case once the base level of chlorine has been established the use of chlorine in combination with the DMH can be used to provide a buffer to maintain the pool water in a person friendly condition even though the bather load has spiked the need for additional chlorine to accommodate the effects of the bathers in the pool.

Figure 5:
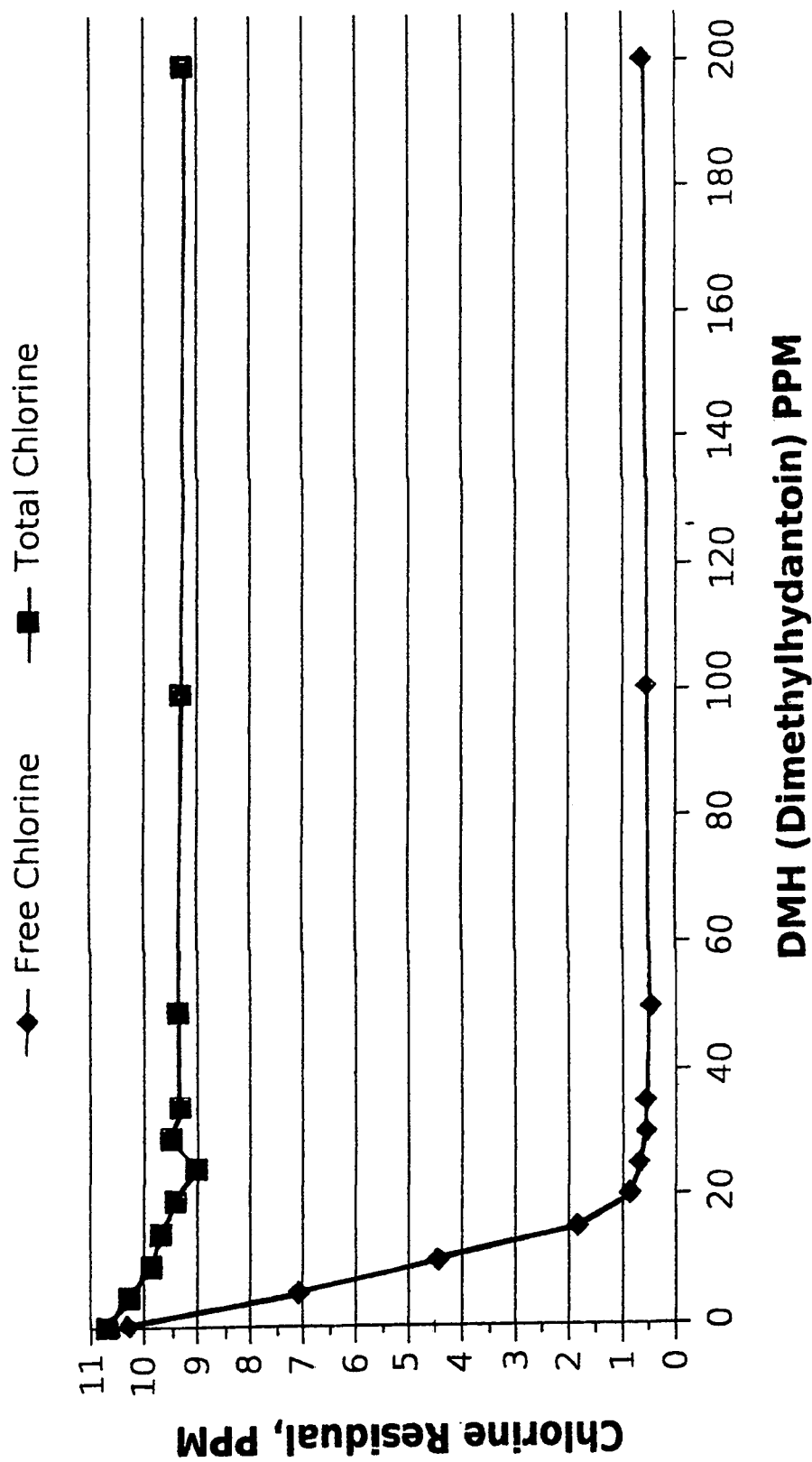
FIG. 5 is a graph of the free chlorine and total chlorine as a function of the amount of DMH in the 300-gallon Marquis Destiny Spa.

One of the features of the invention is that the addition of DMH to the body of recreational water, which contains chlorine, causes the free chlorine level in the body of water to reach an equilibrium state even though the temperature of the body of water may range from 70° F. to 104° F. Once the equilibrium state is reached the free chlorine as well as the total chlorine in the body of recreational water has been found to remain constant as the amount of DMH is increased. To illustrate this feature reference should be made to the example two, which is shown in graph form in FIG. 5. That is, FIG. 5 shows both the free chlorine and the total chlorine in the body of water as a function of the amount of DMH in the water with the level of free chlorine decreasing to about 0.5 ppm and remaining at 0.5 ppm as additional DMH is added to the body of water.

Example 2

In this example a 300 gallon Marquis Destiny spa was filled with tap water with pH down added to the body of water to adjust the pH of the water. The use of a 300 gallon spa for testing was for convenience since the use of both dimethylhydantoin (DMH) and Dichlor are scalable feature that applies to large bodies of water such as pools as well as smaller bodies of water such as hot tubs, spas or the like. In this example both dimethylhydantoin (DMH) and Dichlor in solid form were added directly to the body of water and the free chlorine and the total chlorine were measured and recorded as a function of amount of DMH in the 300-gallon Marquis Destiny spa. Although Dichlor and DMH were added to the body in bulk form various methods and forms of adding chlorine and the DMH to the body of water may be used including dispensers and water dissolvable containers.

The test procedure for Example 2 was as follows:
I. General
1) Record all measurements and chemical additions. The chemical additions shall be made immediately after the measurements are recorded.
2) Chemical additions shall be made by broadcasting over the surface while all of the jets are running in order to fully mix them throughout the body of water.
II. Startup
1) Fill with fresh tap water, with softener partially bypassed to give approximately 200 parts per million of calcium hardness.
2) Adjust temperature setting to 85 degrees Fahrenheit.
3) Add Sodium Bisulfate "pH Down" to adjust alkalinity into the 80-120 ppm range.
4) Add Sodium Dichloroisocyanurate-dihydrate "dichlor" to overcome the initial chlorine demand of the water.
5) If needed, adjust pH into the 7.2 to 7.8 range by running the jets.
6) Measure & record temperature
III. Free Chlorine vs. DMH Test
1) Adjust the free chlorine residual to approximately 10 ppm.
2) Measure and record chlorine residuals, pH, and total alkalinity.

3) Incrementally increase DMH concentration and record residuals & pH.

Figure 4:
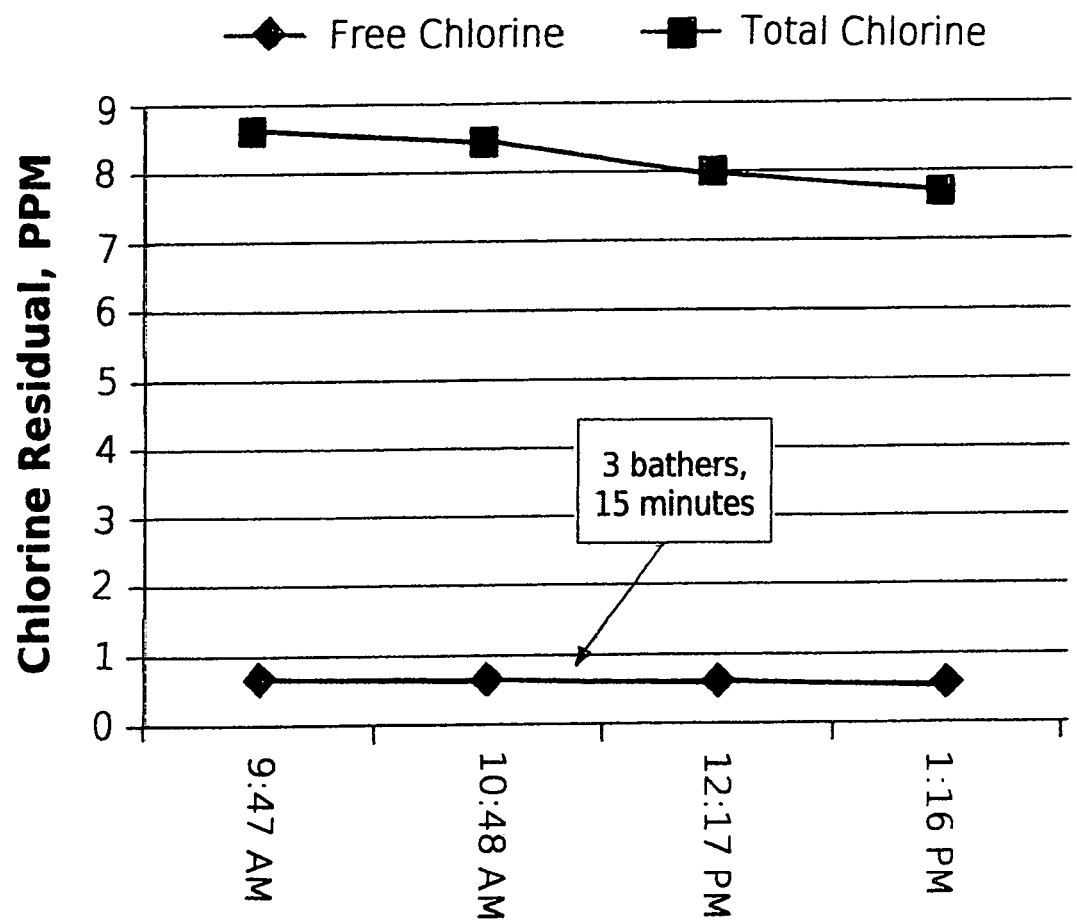
FIG. 4 is a table of the contents of a 300-gallon Marquis Destiny Spa containing tap water, Dichlor, DMH and pH down.

FIG. 4 shows a table of the results of the measurements of the total and free chlorine in the 300-gallon Marquis Destiny spa as well as the DMH in the body of water.

A reference to FIG. 5, which shows a graph of the free chlorine and the total chlorine as a function of the amount of DMH in the water shows that the total chlorine remains above 9 ppm as the DMH is increased from 1 to 200 ppm. On the other hand the free chlorine drops to about 0.5 ppm and remains at about 0.5 ppm as the concentration of DMH in the body of water is increased from 20 to 200 ppm.

To verify the benefit of the use of DMH tests were conducted in a seasonal outdoor pool to determine the response to environmental loads as well as to period bather loads.

In the first step the water conditions of an outdoor pool was set up that includes:
1. Initially setting the water temperature of the pool about 85° F. although the water temperature will fluctuates due to outside weather conditions
2. Adjusting the Calcium Hardness of the pool water to 200 ppm
3. Adjusting the Alkalinity of the pool water to be within the range of 80-120 ppm
4. Adjusting the pH of the pool water to be within the range of 7.2 to 7.8

The above base conditions are typical of a pool set up conditions and created through the use of known pool products in order to create a body of water that is suitable and comfortable for use by an individual or a group of individuals and in some instances the base conditions may be changed for the convenience of the pool owner without departing from the spirit and scope of the invention as long as the total chlorine level can be reduced to a free chlorine level of about 1 ppm or less through the addition of DMH to the body of water.

Once the pool water is prepared for human use a sufficient amount of DMH is added to the pool water to bring the DMH concentration in the pool up to 200 ppm. While more or less DMH may be used it is preferred to have at least 200 ppm since the DMH eventually degrades during pool use. Typically, under most pool use an initial dose of 200 ppm of DMH lasts about 30 days. It is noted that it is further preferred to have the DMH concentration in the pool maintained between ppm and 200 ppm, which may also be referred to as a "working" concentration or of DMH.

In the next step chlorine is added to the water containing the DMH to bring the total chlorine level up to at least 5.0 ppm, which has been found to raise the level the free chlorine in the water to 0.5 to 1.0 ppm. Chlorine may be added to the water in the pool in several different ways including but not limited to 1. liquid bleach (NaClO), 2. Calcium hypochlorite (CA(ClO)) or 3. Trichloroisocyanauric acid (C3Cl3N3O3). An unknown relationship exists between the chlorine and the DMH that causes the free chlorine in the pool to stabilized and be maintained between a levels of 0.5 to 1.0 pm as shown in FIG. 5. In addition although the free chlorine level is maintained between 0.5 and 1.0 ppm it has been found that the likely relationship between the DMH and the attached or combined chlorine in the body of water forms a reservoir of chlorine that can be used to compensate for the excess free chlorine use required by a periodic chlorine load on the pool. For example, by periodic load it is understood to include a need for additional free chlorine to compensate for the use of pool by a group of people although other types periodic loads, which consume chlorine, may also be compensated for with the invention described herein.

In the next step the operator adjust the chlorine dispenser to deliver a constant rate of chlorine into the pool. The delivery of a constant rate of chlorine is intended to balance the ongoing needs of the pool as it responds the external environment and is considered a base level to handle the typical ongoing chlorine needs of the pool.

During use of the pool the operator periodically tests the level of chlorine and adjust the rate of chlorine release from a dispenser in event the ongoing chlorine needs of the pool changes. For example, the ongoing chlorine needs of the pool may change due to sunlight or organic debris that may enter the pool, such as but not limited to after a storm. These types of changes in chlorine needs are considered long-term changes and are compensated typically through a manual adjustment of the amount of chlorine delivered to the pool.

After a set period (30 days preferred) additional DMH may be needed to be added to the pool to bring the concentration of DMH in the pool back to a "working" concentration or the effect of maintaining a reservoir of free chlorine is lost as the DMH decreases with time. The pool with the DMH is now set to handle the periodic spikes or loads on the pool due to periodic bather use Under some conditions the algae growth in pool may cause an increase in free chlorine use that cannot be overcome by the chlorine reservoir (attached chlorine-DMH reservoir). At this point one can add an algaecide to the pool water.

Because the DMH effectiveness in neutralizing the free chlorine decreases it becomes necessary to replenish the DMH after a period of time.

A feature of the invention described herein is that there are a number of ways one can obtain a free chlorine maintained system. A free chlorine maintainer, which comprises a chlorinating agent and DMH, can be separately introduced into the body of recreational water far the in situ formation of the free chlorine maintainer in the body of recreational water. In one example DMH is added to the body of water followed by the addition of a chlorinating agent until the chlorine reaches an equilibrium state at about 1.0 ppm. In another example chlorine is added to the body of recreational water followed by the addition of sufficient DMH to bring the chlorine into an equilibrium state, which is about 1 ppm. In still another example the DMH and chlorine agent may be simultaneously delivered to the body of water either in bulk form or through a container that is thrown or placed in the body of water, for example a container that dissolves in the body of water to release the chlorinating agent and dimethyl hydantoin. Thus there are multiple ways one can obtain a free chlorine maintained system.

In the example described a chlorinating agent such as sodium dichloroisocyanurate dihydrate is added to the body of water before dimethylhydantoin (DMH) is added. Typically, sufficient chlorinating agent should be added to the body of water to bring the free chlorine level in the body of water to at least 1.0 ppm but less than 20 ppm. Subsequently, sufficient dimethylhydantoin (DMH) should be added to the body of water to bring the free chlorine level in the body of water to an equilibrium state of about 1.0 ppm. Typically, adding sufficient dimethylhydantoin to bring the dimethylhydantoin concentration in the body of water to at least 20-ppm results in a free chlorine equilibrium state ranging from about 0.5 ppm to 1.0 ppm. Increasing the concentration of dimethylhydantoin in the body of water from 20 ppm to 200 ppm has not been found to reduce the free chlorine equilibrium in the body of water.

In one method of the invention dimethylhydantoin (DMH) is separately added to the body of water followed by the separate addition of the chlorinating agent. It has been found that both the DMH and free chlorine in the body of water degrade with time one method of maintaining the body of water is to periodically add DMH and chlorine to the body of water. This maintenance additions of DMH and chlorine may be done separately or at the same time.

The invention also includes a method of maintaining the free chlorine in a body of water for human immersion between 0.5 ppm and 1.0 ppm while other features of the water are maintained as the water is subject to a bather load that normally decreases the free chlorine. Preferably one wants to add a chlorinating agent to overcome the initial sanitizing chlorine demand of the body of water. Typically, one maintains a temperature of the body of water between degrees 70° F. to 104° F. while it is preferred to adjust the alkalinity of the body of water to between 80 ppm and 120 ppm, for example by adding sodium bisulfate. It is also for comfort it is preferred to maintain the pH in the body of water in the range of 72 to 7.8. Typically, in one method one adds chlorine to the body of water to bring the total chlorine level in the body of water to between 1-20 ppm and then adds DMH to the body of water to bring the level of free chlorine down to about 1.0 ppm. One can then subject the body of water to a normal bather load or other type of normal load, such as from rain. Although the typical load placed on the body of water, which absorbs free chlorine in the body of water, has been found to not decrease the free chlorine less than 0.5 ppm. As described herein the typical load for a body of water may vary and consequently the time between additions of chlorine may vary from spa to spa. For example, in some cases the free chlorine level may reside at appropriate levels for a period of months based on the typical bacterial load and in other cases the free chlorine level may last for a period of weeks due to the heavier bacterial load. In each case the primary determination of the additional length of time that the system maintains itself at safe free chlorine level is to a certain extent determined by the bacterial load normally experienced by the body of water.

A feature of the invention described herein is that in systems where the free chlorine have been purposely or accidentally raised to levels that are considered harmful for recreation use, which some sources indicates as being as low as 2.5 ppm, the body of water can be rendered suitable for recreational use through the addition of DMH to the body of water. In the example shown in FIG. 4 and FIG. 5 the free chlorine level in the body of water is lowered through the addition of DMH to the body of water. Note FIG. 4 shows a free chlorine level in excess of 10 ppm being lowered to 0.52 ppm through the addition of DMH to the body of water. Thus the use of DMH becomes effective to reduce the level of free chlorine in a pool without having to increase the bacterial load on the pool.

In one example the invention can comprise a one-shot prepackaged free chlorine maintainer for emptying into a body of water such as a spa or pool to maintain a free chlorine level in the body of water between 0.5 ppm and 1.0 ppm when the body of water is subject to a bather load with the free chlorine maintainer consisting of a chlorinating agent in solid form and DMH in solid form where a weight ratio of the DMH to the chlorinating agent in the body of water is at least 0.5.

While the chlorinating agent described herein comprises sodium dichlorocyanurate dihydrate other chlorinating agents may be used to establish the free chlorine level in the body of water. For example a chlorinating agent selected from the group consisting of both organic and inorganic agents including trichloroisocyanauric acid, potassium dichloroisocyanurate, dichlorocyanurate dihydrate, calcium hypochlorite, lithium hypochlorite and sodium hypochlorite.

Figure 6:
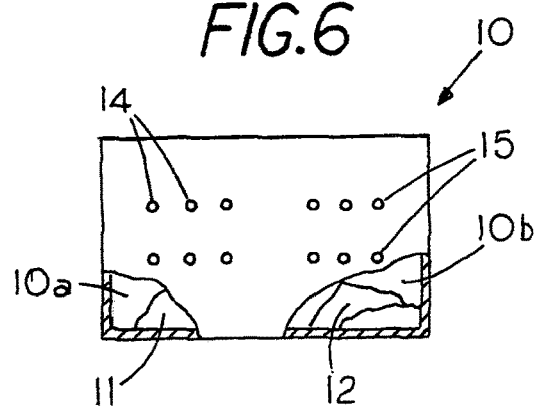
FIG. 6 shows a dispenser partly in section with the dispenser containing a chlorinating agent and DMH for placement of the dispenser directly in a body of water.

FIG. 6 shows a prepackaged free chlorine maintainer for emptying into a body of water to maintain free chlorine level in the body of water between 0.5 ppm and 1.0 ppm when the body of water is subject to a bather load with the free chlorine maintainer consisting of a chlorinating agent in solid form and DMH in solid form where a weight ratio of the DMH to the chlorinating agent in the body of water is at least 0.5 In this example the container has a first compartment 10a that contains the chlorinating agent 11 with the container having ports 14 for water access to the chlorinating agent therein and a second compartment 10b that contains DMH 12 with ports 15 therein to permit water access to the DMH therein. While the DMH and chlorinating agent are added from the same dispenser they also can be added separately and at different times and the chlorine may be added to the body of water either in solid or liquid form.

Figure 7:
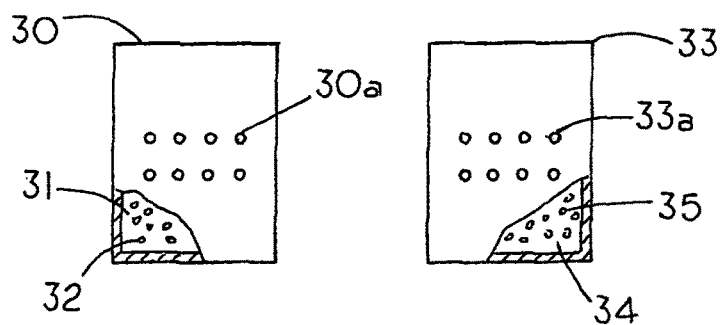
FIG. 7 shows a two part dispensing system for separate placement of a chlorinating agent and DMH into a body of water with each dispenser partly in section.

FIG. 7 shows another example of a spa product for maintaining the free chlorine level between 0.5 ppm and 1.0 ppm in a body of water subject to a bather load with the spa product. In this example there is provided a first dispenser 30 having a compartment 31 containing a chlorinating agent 32 selected from the group consisting of trichloroisocyanauric acid, potassium dichloroisocyanurate, and sodium dichlorcyanurate with the dispenser having at least one port 30a for water access to the chlorinating agent therein when the dispenser 30 is placed in the body of water. In this example the spa product includes a second dispenser 33 with a compartment 35 containing dimethylhydantoin 34 with the second dispenser 33 having at least one port 33a for water access for release of the dimethylhydantoin into the body of water.

While the dispenser are shown as the type that are placed directly in the body of water the dispenser may be of the inline type that is placed in a dispenser where water is circulated through the dispenser. Examples of such dispensers are shown in King et al. U.S. Pat. Nos. 7,347,935 and 8,464,743, which are incorporated by reference.

Various chemical chlorinating agents are disclosed herein that are dispensed into the body of water, however, in some instance one may find it suitable to use a chlorine generator. While in water dispensers are shown one may want to use a bulk dispenser where the water is directed through a dispersant located in the bulk inline dispenser. Examples of bulk inline dispensers are shown in king U.S. Pat. No. 8,757,188, which is hereby incorporated by reference.

Although not shown the present invention may also comprise a swimming pool free chlorine maintaining kit for use in an inline dispenser of a swimming pool body of water that has been sanitized with a chlorinating agent to render the body of water safe for human immersion and subject to a periodic bather load and environmental conditions. The swimming pool free chlorine maintaining kit includes a first dispensing cartridge and a second dispensing cartridge each separately loadable into the inline dispenser of the swimming pool body of water.

The first dispensing cartridge includes a bottom inlet and a bottom outlet and contains an immediate dispensable or quickly dispensable DMH supported therein in sufficient amount to bring a DMH level in the swimming pool body of water to at least 26 ppm. By immediate dispensable or quickly dispensable, it is meant that the DMH is completely dispensable into the swimming pool body of water within 30 minutes and preferably within 15 minutes.

The second dispensing cartridge includes a bottom inlet and a bottom outlet and contains a time dispensable chlorinating agent therein to bring the total chlorine level in a swimming pool body of water containing at least 26 ppm DMH to between 3.0 and 10 ppm total chlorine with the concentration of DMH maintaining a free chlorine level in the swimming pool body of water to a range 0.5 ppm to 1.0 ppm free chlorine.

The swimming pool free chlorine maintaining kit may also include a third dispensing cartridge separately loadable into the inline dispenser of the swimming pool body of water with the third dispensing cartridge containing a time dispensable combination chlorinating agent and algaecide dispensable into the swimming pool body of water in response to a decrease of the free chlorine level in the swimming pool body of water to less than 0.5 ppm free chlorine to kill existing algae and control algae growth in the body of water while bringing the total chlorine level in the swimming pool body of water back to between 3.0 and 10 ppm.

The third dispensing cartridge may alternatively contain an immediate dispensable algaecide therein, the algaecide dispensable into the swimming pool body of water at the sign of algae growth to kill existing algae and control algae growth in swimming pool body of water.

The present invention also includes a method of maintaining the free chlorine in a body of water for human immersion between 0.5 ppm and 1.0 ppm when subject to a bather load and environmental conditions that decreases the free chlorine comprising the steps of (1) maintaining a temperature of the body of water between degrees 70° F. to 104° F., (2) sanitizing the body of water with a chlorinating agent to render the body of water safe for human immersion, (3) adjusting the alkalinity of the body of water to between 80 ppm and 120 ppm by adding either sodium bicarbonate to raise the alkalinity or muriatic acid to lower the alkalinity, (4) maintaining the pH in the body of water in the range of 7.2 to 7.8, (5) loading a first dispensing cartridge containing an immediate dispensable DMH therein into an inline dispenser of the body of water to bring a DMH level in the body of water to at least 26 ppm, (6) loading a second dispensing cartridge containing a time dispensable chlorinating agent therein into the inline dispenser of the body of water to bring the total chlorine level in a body of water containing at least 26 ppm DMH to between 3.0 and 10 ppm total chlorine with the concentration of DMH maintaining a free chlorine level in the swimming pool body of water to a range 0.5 ppm to 1.0 ppm free chlorine, and then (7) subjecting the body of water to a bather load where the bather load consumes free chlorine and combined chlorine in the body of water without decreasing the free chlorine to less than 0.5 ppm level.

The above method of maintaining the free chlorine in a body of water for human immersion between 0.5 ppm and 1.0 ppm when subject to a bather load and environmental conditions that decreases the free chlorine may also include the steps of (8) loading a third dispensing cartridge containing a time dispensable combination chlorinating agent and algaecide therein into the inline dispenser of the body of water in response to a decrease of the free chlorine level in the body of water to less than 0.5 ppm free chlorine to kill existing algae and control algae growth in the body of water while bringing the total chlorine level in the body of water back to between 3.0 and 10 ppm, (9) loading a third dispensing cartridge containing an immediate dispensable algaecide therein into the inline dispenser of the body of water at the sign of algae growth water to kill existing algae and control algae growth in the body of water, (10) loading a third dispensing cartridge containing a time dispensable combination chlorinating agent and algaecide therein into the inline dispenser of the body of water at the sign of algae growth to kill existing algae and control algae growth in the body of water while bringing the total chlorine level in the body of water back to between 3.0 and 10 ppm, and (11) loading a third dispensing cartridge containing an immediate dispensable DMH therein into the inline dispenser of the body of water to bring the DMH level in the body of water up to at least 20 ppm.

Figure 8:
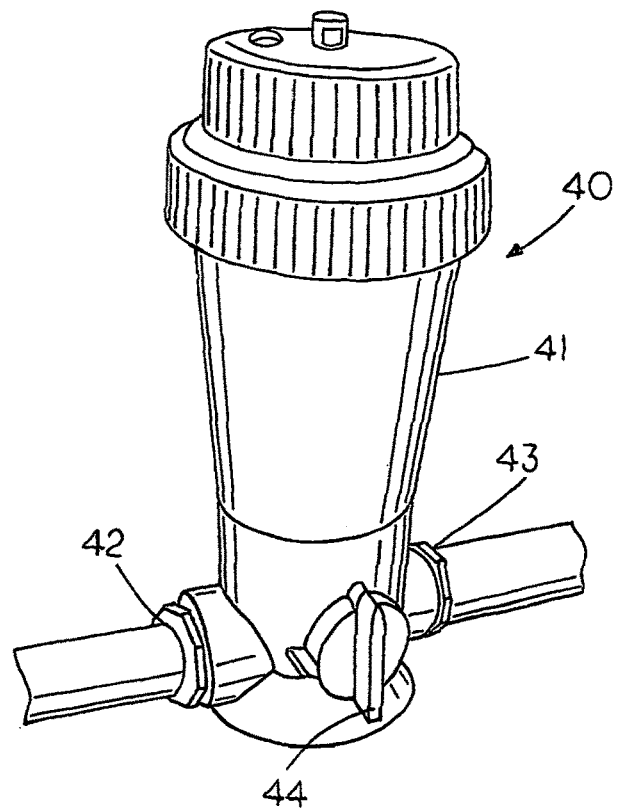
FIG. 8 is a perspective view showing a dispersal valve for normally and controllable dispersing multiple water treatment dispersants into a body of recreational water.
Figure 8A:
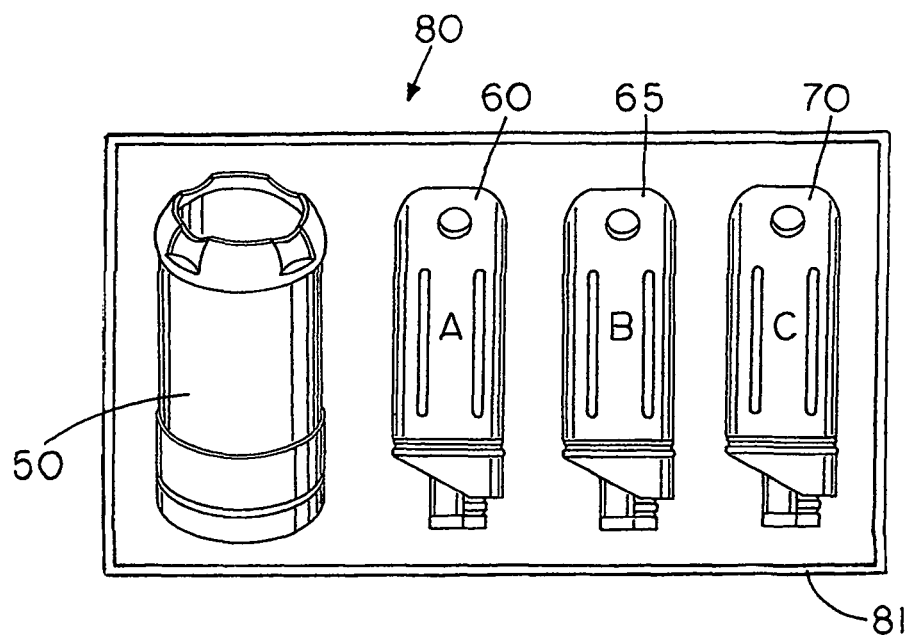
FIG. 8A shows a kit.

FIG. 8 shows an example of a dispersal valve 40 and FIG. 8A shows an example of a seasonal pool water treatment kit 80 that contains four canisters 51, 60, 65 and 70, which are suitable for dispensing materials when they are located in dispersal valve 40. In this example the seasonal pool water treatment kit 80 comprises a set of four nestable canisters 51, 60, 65 and 70 that can be periodically removed and replaced in dispersal valve 40 to provide season long outdoor pool maintenance for a pool, which is typically used in only the summer months. A box or other type of container 81 may be used to both store and deliver the seasonal pool water treatment kit to a consumer.

Referring to FIG. 8, reference numeral 40 general identifies a dispersal valve for normally and controllable dispersing multiple water treatment dispersants into a body of recreational water. Dispersal valve 40, which is shown in greater detail in King U.S. Pat. No. 6,190,547, includes a fluid inlet 42 on one side of a housing 41 and a fluid outlet 43 located on the opposite side of housing 41. A rotary plug 44 permits a user to control the velocity of the fluid mixing stream that is directed through the dispersal valve 40 and through the nestable canisters located in the dispersal valve 40.

Figure 9:
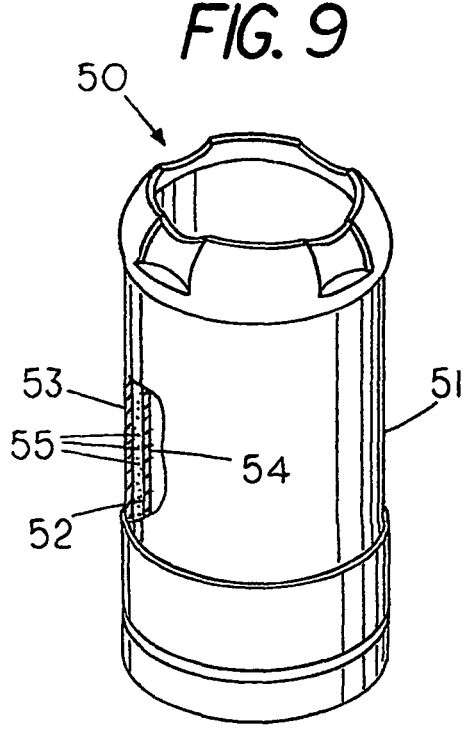
FIG. 9 shows a partial cutaway perspective view of an annular nestable canister supporting water treatment minerals therein for use in the dispersal valve of FIG. 8.

FIG. 9 shows a partial cutaway perspective view of an annular nestable canister 50 for insertion into dispersal valve 40. Nestable canister 50 is made from a rigid polymer plastic and normally stands in an upright position in a dispersal valve. In use the cylindrical nestable canister 60 can be nested within the annular nestable canister 50, as illustrated in FIG. 11. In the nested condition the two canisters 50 and 60 simultaneous deliver dispersant into the water flowing through the dispersal valve 40. Kit 80 also includes nestable canisters 65 and 70, which are shown in isolated and partial cut away views in FIG. 12 and FIG. 13. The three cylindrical nestable canisters 60, 65 and 70 (FIGS. 10, 12, and 13) are interchangeable with each other and provide dispersal valve 40 with multiple water treatment options for dispensing water treatment materials into a body of recreational water. The use of additional interchangeable nestable canisters 65 and 70 provide for a convenient seasonal system for on-the-go maintenance of an outdoor pool with a minimum of maintenance. In this example, annular canister 50 includes an outer cylindrical surface 51 that enables canister 50 to be axially inserted into an interior chamber of dispersal valve 40. In addition, nestable canister 50 has a central open region where a second nestable canister 60 can be functionally nested therein so that both canister 50 and canister 60 can simultaneously deliver dispersants to the water flowing through the dispersal valve. FIG. 9 shows nestable canister 50 also includes an annular chamber 54 defined by a cylindrical inner wall 52 and an outer cylindrical wall 53 with the annular chamber supporting typical water treatment materials such as minerals 55 therein. An example of minerals can be found in King U.S. Pat. No. 9,227,860, which is herby, incorporated by reference.

Figure 10:
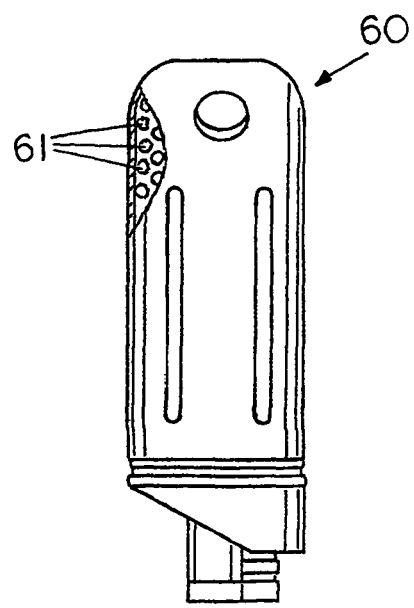
FIG. 10 shows a partial cutaway side view of a second nestable canister containing a chlorinating agent therein for use in the dispersal valve of FIG. 8.
Figure 11:
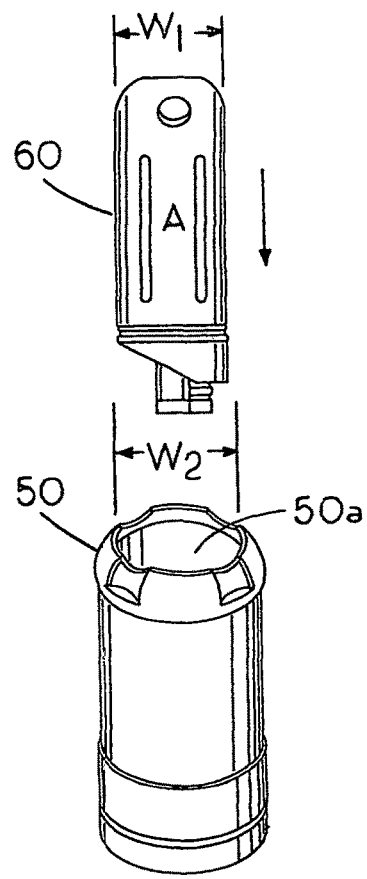
FIG. 11 is an exploded view showing the second nestable canister of FIG. 10 axially inserted within the nestable canister of FIG. 9 for use in the dispersal valve of FIG. 8.

FIG. 10 shows a partial cutaway side view of a cylindrical nestable canister 60. In the embodiment of FIG. 10, the cutaway view shows dispersants comprising a chlorinating agent 61 located within nestable canister 60. Examples of chlorinating agent 61 include chlorine tablets, granular or in powder form for killing bacteria although other types of chlorinating agents may be used. The operation of nestable canister 60 is similar to the operation of nestable canister 50 with the operation of the nestable canister shown and described in King U.S. Pat. No. 6,190,547, which is herby incorporated by reference.

Figure 12:
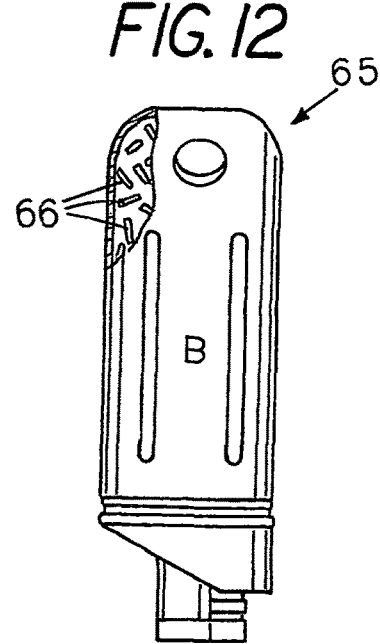
FIG. 12 shows a partial cutaway side view of a second nestable canister quickly dispensable DMH therein for use in the dispersal valve of FIG. 8.
Figure 13:
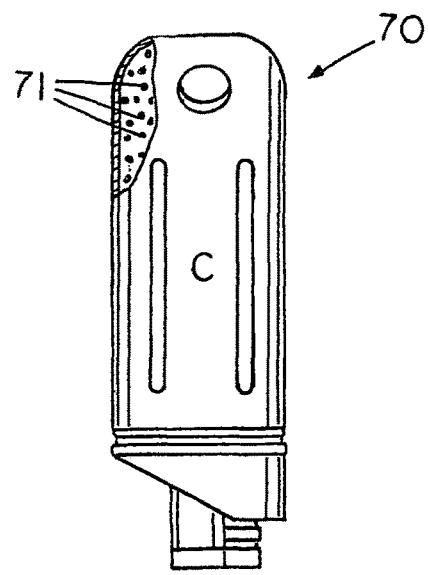
FIG. 13 shows a partial cutaway side view of a second nestable canister containing an immediate dispensable algaecide therein for use in the dispersal valve of FIG. 8.

FIGS. 10, 12 and 13 show examples seasonal dispersant canisters A, B and C that can be used to maintain a body of water such as a swimming pool during a typical outdoor season through a periodic rotation or replacement of canisters within the annular canister 50. In this example, the set of four canisters comprise an outer annular canister 50, which contains a first dispersant and a set of interchangeable canisters 60, 65 and 70, which can be individually fitted within annular canister 50. FIG. 8A shows the interchangeable canisters comprising a first cylindrical canister 60 (labeled A), which contains a second dispersant, a second cylindrical canister 65 (labeled B), which contains a second dispersant and a third cylindrical canister 70 (labeled C) which contains a third dispersant. Although four canisters are shown more or less canisters may be used depending on the type of seasonal water treatment needed.

FIG. 11 is an exploded view showing how nestable canister 60 can be axially inserted within a cylindrical chamber 50a in the annular nestable canister 50. Nestable canister 60 includes an outer dimension designated by $W_1$ and nestable canister 50 has an inside dimension designated by $W_2$ with $W_2$ greater than $W_1$ so that canister 60 can be freely inserted within chamber 50a in the interior of canister 50. Nestable canister 65 and 70 are similarly dimensioned so that they can be inserted and removed from the annular nestable canister 50. Once in position water directed through the bottom of the dispersal valve 40 comes into contact with the dispersants in the annular canister 50 and the cylindrical canister located within the annular canister 50.

FIG. 12 shows a partial cutaway side view of the second nestable canister 65. In this example, Canister B contains DMH with the DMH in an immediate dispensable state or a quickly dispensable state. By "immediate dispensable" or "quickly dispensable", it is meant that the DMH contained within the dispenser can be dispensed into the swimming pool within 30 minutes or less and preferably within 15 minutes after coming into contact with the water. (need to explain source of DMH)

Once the DMH is dispensed into the body of water canister B is removed from canister 50 and replaced with canister A from the set of seasonal canisters 50, 60 (canister A), 65 (canister B) and 70 (canister C). Canister A, which in this example contains a chlorinating agent 61 and the canister 50 which contains minerals 55 can now simultaneously dispense dispersant therein into the body of water to thereby seasonally maintain the body of water as the water flows through the dispersal valve containing the two canisters.

FIG. 13 shows a partial cutaway side view of the third nestable canister 70 (canister C) with a dispersant 71 therein. In this example canister C contains a dispersant 71 comprising an algaecide 71. To add the algaecide to the water the canister A in the nestable canister is removed and replaced with canister C containing the algaecide therein to thereby deliver the algaecide into the body of water. Once the algaecide is dispensed the canister C is removed and is replaced by Canister A, which contains the chlorinating agent. In this example the algaecide in canister C is delivered into the body of water through the canister in the dispersal valve, however, one may elect to deliver the algaecide directly into the body of water which eliminates the step of removing and replacing the canister A with canister C since the algaecide can be added independent of the dispersal valve canisters.

Preferably, a quickly dispensable algaecide 71 is used. Once the algaecide has been dispensed into the body of water the dispenser 71 is removed and the dispenser A with the chlorinating agent is placed in dispersal valve 40 to allow the chlorinating agent and the minerals to maintain the pool water. While in this example the algaecide has been introduced through an interchangeable canister in some instances the algaecide may be introduced into the pool independent of the dispersal valve system. In such an example the algaecide may be packaged in a non-interchangeable dispenser that can dispense the algaecide directly into the pool.

As described herein the start-up phase of the pool water treatment system begins with dispensing of the DMH, along with water treatment minerals 55, into the outdoor swimming pool body of water by loading nestable canister 50 and nestable canister 65 into dispersal valve 40 and activating the dispersal valve 40. The amount of DMH 66 in nestable canister 65 is determined by pool size such that the complete dispensing of the DMH 66 in nestable canister 65 brings the DMH level in the swimming pool to at least 26 ppm.

Once the DMH 66 in nestable canister 65 is spent the pool maintenance phase of the pool water treatment system begins with the introduction of a chlorinating agent 61, along with water treatment minerals 55, into the swimming pool through the replacement of the spent nestable canister 65 with a fresh or new nestable canister 60. A feature of the present invention is that chlorinating agent 61, which is time dispensable enables one to bring the total chlorine level in a swimming pool body of water to between 3.0 and 10 ppm with the concentration of DMH, which is about 26 ppm, maintaining a free chlorine level in the swimming pool body of water to a range 0.5 ppm to 1.0 ppm free chlorine.

A pool booster phase, which may be used in some cases, begins with the addition of an algaecide. The pool booster phase is an optional on demand phase that generally occurs in response the presence of algae growth leading to a decrease of the free chlorine level in the swimming pool body of water to less than 0.5 ppm free chlorine. The pool booster phase may be addressed with the aforedescribed introduction of an immediate dispensable algaecide 71, along with water treatment minerals 55, into the swimming pool body of water through the replacement of nestable canister 60 (canister A) with nestable canister 70 (canister C containing the algaecide) to kill existing algae and control algae growth in the body of water while bringing the total chlorine level in the swimming pool body of water back to between 3.0 and 10 ppm. Once the algaecide in nestable canister 70 is dispensed into the pool the spent nestable canister 70 is replaced with the nestable canister 60 unless nestable canister 60 is also empty. In the event that canister 60 is also empty the spent nestable canister 70 is replaced with a fresh or new canister 60 that contains a fresh amount of chlorinate agent.

The pool booster phase starts with the introduction of an immediate dispensable algaecide 71, along with water treatment minerals 55, into the swimming pool body of water through the replacement of nestable canister 60 with nestable canister 70 to kill existing algae and control algae growth in the body of water while bringing the total chlorine level in the swimming pool body of water back to between 3.0 and 10 ppm. Once the algaecide is completely dispensed the spent nestable canister 70 is replaced with the used nestable canister 60 unless nestable canister 60 is also empty. In the event that canister 60 is also empty the spent nestable canister 70 is then replaced with a fresh or new canister 60.

As an alternative, instead of having the algaecide in nestable canister 70 the algaecide may be directly poured into the pool. In this example the canister with the chlorinating agent 60 need not be removed from the dispersal valve 40 during the delivery of the algaecide to the pool.

Thus, in a typically outdoor pool season the pool owner may first use Canister B in annular canister 50 followed by canister A, which is followed by canister C, which is again followed by canister B. Thus the kit 80 provides a convenient way for maintaining an outdoor pool throughout the outdoor season without the need with the pool owner having to come into contact with the pool chemicals.

The inventions described herein includes a number of methods of maintaining the free chlorine in a body of water for human immersion between 0.5 ppm and 1.0 ppm when subject to a bather load that consumes the free chlorine. In one method one adds a chlorinating agent to overcome the initial sanitizing chlorine demand of the body of water while maintaining a temperature of the body of water between degrees 70° F. to 104° F. One adjusts the alkalinity of the body of water to between 80 ppm and 120 ppm by adding either sodium bicarbonate to raise the alkalinity or muriatic acid to lower the alkalinity while maintaining the pH in the body of water in the range of 7.2 to 7.8. One adds chlorine to the body of water to bring the total chlorine level in the body of water between 1-20 ppm followed by adding DMH to the body of water to bring the level of free chlorine to about 1 ppm. At this point one can subject the body of water to a bather load where the bather load consumes free chlorine and combined chlorine in the body of water without decreasing the free chlorine level to less than 05 ppm. The method may include adding chlorine to the body of water to bring the total chlorine level in the body of water between 1-20 ppm by adding chlorine from the group consisting of trichlor, calcium hypochlorite, sodium hypochlorite and sodium dichloroisocyanurate dihydrate to the body of water to bring the free chlorine level in the body of water to at least 1.0 ppm. The method may also includes adding an additional chlorinating agent to the body of water to bring the total chlorine level in the body of water back to at least 3.0 ppm but less than 10 ppm after the free chlorine level of the body of water drops below 0.5 ppm. The method may also include adding a recharging dose of 5, 5-dimethylhydantoin to bring the 5, 5-dimethylhydantoin in the body of water up to at least 10 ppm.

A further method of maintaining the free chlorine in a body of water for human immersion between 0.5 ppm and 1.0 ppm when subject to a bather load that decreases the free chlorine by maintaining the pH in the body of water in the range of 72 to 7.8 through the addition of pH up or pH Down where pH up comprises sodium bicarbonate and pH down comprise sodium bisulfate. In this method one maintains a temperature of the body of water between 65-105 degrees F. and adjusts the alkalinity of the body of water to between 80 ppm and 120 ppm by either adding either sodium bicarbonate or a dry or liquid acid to the body of water. In this method one adds a chlorinating agent to the body of water to bring the total chlorine level in the body of water to at least 3.0 ppm and adds sufficient 5-5 dimethylhydantoin to the body of water to bring the level of free chlorine to about 1.0 ppm at this point one can subject the body of water to a bather load where the bather load consumes free chlorine in the body of water without decreasing the free chlorine to less than OS ppm by adjusting a chlorine release rate from a dispenser until the free chlorine level remains above 1 ppm when subject to the bather load that consumes at least a portion of the free chlorine available in the body of water. The above method may include adding at least 3.5 ounces of DMH per gallon of water to bring the DMH concentration to at least 26 ppm.

A method of the invention may also include maintaining a safe free chlorine level in a body of water for recreational use where the free chlorine level at a harmful level measuring the free chlorine level in the body of water to determine if the free chlorine level in the body of water is above a safe level. The method may also include adding sufficient DMH to the body of water to bring the free chlorine down to a safe level by adding DMH to the body of water if the free chlorine level is above 3.5 ppm to reduce the free chlorine level to below 3.5 ppm.

A method of the invention may include a further method for extending the useful life of an outdoor pool wherein a chlorinating agent is continually or intermittently dispensed into the outdoor pool with the total chlorine level of the pool water ranging from 3-10 ppm by adding sufficient DMH to the pool to restore the DMH level to a level that maintains the free chlorine below 1.0 ppm. The above method may include periodically add additional DMH to the pool to bring the DMH level to at least 26 ppm. The above method may include having a chlorinating agent dispensed into the pool selected from the group consisting of liquid bleach (NaClO), calcium hypochlorite (CA(ClO)), and Trichloroisocyanauric acid (C3C3N3O3).

A method of the invention may include a method of maintaining the free chlorine in a body of water for human immersion between 0.5 ppm and 1.0 ppm when subject to a bather load and environmental conditions that decreases the free chlorine through maintaining a temperature of the body of water between degrees 70° F. to 104° F.; sanitizing the body of water with a chlorinating agent to render the body of water safe for human immersion; adjusting the alkalinity of the body of water to between 80 ppm and 120 ppm by adding either sodium bicarbonate to raise the alkalinity or muriatic acid to lower the alkalinity; maintaining the pH in the body of water in the range of 7.2 to 7.8; adding chlorine to the body of water to bring the total chlorine level in the body of water between 1-20 ppm; adding DMH to the body of water to bring the level of free chlorine to about 0.5 to 1.0 ppm; and subjecting the body of water to a bather load where the bather load consumes free chlorine and combined chlorine in the body of water without decreasing the free chlorine to less than 0.5 ppm level. In the above method one may add chlorine to the body of water to bring the total chlorine level in the body of water between 1-20 ppm by adding chlorine to the body of water to bring the total chlorine level in the body of water between 3 and 10 ppm. In the above method one may add an additional chlorinating agent to the body of water to bring the total chlorine level in the body of water back to between 3 and 10 ppm after the free chlorine level of the body of water drops below 0.5 ppm. In the above method one may add a recharging dose of 5, 5-dimethylhydantoin to bring the 5, 5-dimethylhydantoin in the body of water up to at least ppm. In the above method one may maintain a concentration of the 5, 5-dimethylhydantoin in the body of water above 20 ppm. The above method may include adding an algaecide to the body of water at the sign of algae growth. Alternately, the method may include adding an algaecide to the body of water and an additional chlorinating agent to the body of water to bring the total chlorine level in the body of water back to between 3.0 and 10 ppm at the sign of algae growth.

A method of the invention may include maintaining the free chlorine in a body of water for human immersion between 0.5 ppm and 1.0 ppm when subject to a bather load and environmental conditions that decreases the free chlorine comprises maintaining a temperature of the body of water between degrees 70° F. to 104° F. by sanitizing the body of water with a chlorinating agent to render the body of water safe for human immersion; adjusting the alkalinity of the body of water to between 80 ppm and 120 ppm by adding either sodium bicarbonate to raise the alkalinity or muriatic acid to lower the alkalinity; maintaining the pH in the body of water in the range of 7.2 to 7.8; loading a first dispensing cartridge containing an immediate dispensable DMH therein into an inline dispenser of the body of water to bring a DMH level in the body of water to at least 26 ppm; loading a second dispensing cartridge containing a time dispensable chlorinating agent therein into the inline dispenser of the body of water to bring the total chlorine level in a body of water containing at least 26 ppm DMH to between 3.0 and 10 ppm total chlorine with the concentration of DMH maintaining a free chlorine level in the swimming pool body of water to a range 0.5 ppm to 1.0 ppm free chlorine; and then subjecting the body of water to a bather load where the bather load consumes free chlorine and combined chlorine in the body of water without decreasing the free chlorine to less than 0.5 ppm level. In the above method one may include the step of loading a third dispensing cartridge containing a time dispensable combination chlorinating agent and algaecide therein into the inline dispenser of the body of water in response to a decrease of the free chlorine level in the body of water to less than 0.5 ppm free chlorine to kill existing algae and control algae growth in the body of water while bringing the total chlorine level in the body of water back to between 3.0 and 10 ppm. The above method may also include loading a third dispensing cartridge containing an immediate dispensable algaecide therein into the inline dispenser of the body of water at the sign of algae growth water to kill existing algae and control algae growth in the body of water. The above method may including the loading a third dispensing cartridge containing a time dispensable combination chlorinating agent and algaecide therein into the inline dispenser of the body of water at the sign of algae growth to kill existing algae and control algae growth in the body of water while bringing the total chlorine level in the body of water back to between 3.0 and 10 ppm. The above may include loading a third dispensing cartridge containing an immediate dispensable DMH therein into the inline dispenser of the body of water to bring the DMH level in the body of water up to at least ppm.

A method of the invention may include a method of treating a swimming pool body of water to maintain a free chlorine in the body of water for human immersion between 0.5 ppm and 1.0 ppm when subject to a bather load and environmental conditions that decreases the free chlorine by maintaining a temperature of the body of water between degrees 70° F. to 104° F.; sanitizing the body of water with a chlorinating agent to render the body of water safe for human immersion; adjusting the alkalinity of the body of water to between 80 ppm and 120 ppm by adding either sodium bicarbonate to raise the alkalinity or muriatic acid to lower the alkalinity; maintaining the pH in the body of water in the range of 7.2 to 7.8; nestably connecting a first dispensing nestable canister containing an immediate dispensable DMH therein into a chamber of an annular dispensing nestable canister containing water treatment minerals therein loading the first dispensing nestable canister with the annular dispensing nestable canister into an inline dispersal valve of the body of water to bring a DMH level in the body of water to at least 26 ppm; replacing said first dispensing nestable canister with a second dispensing nestable canister containing a time dispensable chlorinating agent therein to bring the total chlorine level in a body of water containing at least 26 ppm DMH to between 3.0 and ppm total chlorine with the concentration of DMH maintaining a free chlorine level in the swimming pool body of water to a range 0.5 ppm to 1.0 ppm free chlorine; and then subjecting the body of water to a bather load where the bather load consumes free chlorine and combined chlorine in the body of water without decreasing the free chlorine to less than 0.5 ppm level. The above method may include replacing the second dispensing nestable canister with a third dispensing nestable canister containing a combination time dispensable chlorinating agent and algaecide therein in response to a decrease of the free chlorine level in the body of water to less than 0.5 ppm free chlorine to kill existing algae and control algae growth in the body of water while bringing the total chlorine level in the body of water back to between 3.0 and 10 ppm. The above method may include replacing the second dispensing nestable canister with a third dispensing nestable canister containing an immediate dispensable algaecide therein at the sign of algae growth water to kill existing algae and control algae growth in the body of water. The above method may include the replacing the second dispensing nestable canister with a third dispensing nestable canister containing a combination time dispensable chlorinating agent and algaecide therein at the sign of algae growth to kill existing algae and control algae growth in the body of water while bringing the total chlorine level in the body of water back to between 3.0 and 10 ppm. The above method may replacing the second dispensing nestable canister with a fresh first dispensing nestable canister to bring the DMH level in the body of water up to at least 20 ppm.

The inventions described herein may take various forms including prepackaged free chlorine maintainer for emptying into a body of water to maintain a free chlorine level in the body of water between 0.5 ppm and 1.0 ppm when the body of water is subject to a bather load with the free chlorine maintainer consisting of a chlorinating agent and DMH in solid form where a weight ratio of the DMH to the chlorinating agent in the body of water is at least 0.5 with the DMH and the chlorine maintainer either added separately or at the same time. In this example the chlorine maintainer may be a one-shot prepackaged free chlorine maintainer that includes a water dissolvable polyvinyl alcohol film located around the DMH.

The invention may take the form of a spa product for maintaining the free chlorine level between 0.5 ppm and 1 ppm in a body of water subject to a bather load with the spa product comprising: a first dispenser containing a chlorinating agent selected from the group consisting of trichloroisocyanauric acid (trichlor), potassium dichloroisocyanurate, and sodium dichlorcyanurate (dichlor) with the first dispenser having a port for water access to the chlorinating agent therein when the first dispenser is placed in the body of water; and a second dispenser containing dimethylhydantoin with the second dispenser having a port for water access for release of the dimethylhydantoin into the body of water.

In this example the spa product may have a weight ratio of DMH in the second dispenser to the chlorinating agent in the first dispenser ranging from 0.31 to 6.3 Or a weight ratio of DMH in the second dispenser to the chlorinating agent in the first dispenser that varies as a function of time when the chlorinating agent is sodium dichloroisocyanurate dihydrate.

The invention may take the form of a one-shot prepackaged free chlorine maintainer for emptying into a body of water to maintain a free chlorine level in the body of water between 0.5 ppm and 1.0 ppm when the body of water is subject to a bather load with the free chlorine maintainer consisting of a chlorinating agent in solid form and DMH in solid form where a weight ratio of the DMH to the chlorinating agent is at least 0.5 and the chlorinating agent and the DMH are either added separately or at the same time to the body of water. As an example the one-shot prepackaged free chlorine maintainer containing 5,5-dimethylhydantoin is sufficient to raise the 5,5-dimethylhydantoin level to 10 to 20 ppm in a body of water where a total chlorine concentration is at least 3.0 ppm with the chlorinating agent comprising sodium dichloroisocyanurate or sodium trichloroisocyanurate.

The invention may take the form of a free chlorine maintainer for a body of water wherein a concentration of the free chlorine maintainer consists of a chlorinating agent and 5,5-dimethylhydantoin with the body of water having at least 5.0 grams of the free chlorine maintainer per gallon of water where the chlorinating agent is selected from the group consisting of trichloroisocyanauric acid, potassium dichloroisocyanurate, sodium dichloroisocyanurate as anhydrous or dihydrate form, calcium hypochlorite, lithium hypochlorite and sodium hypochlorite. For example, The prepackaged free chlorine maintainer for a body of water ranging between 100 to 600 gallons wherein the weight of dimethylhydantoin added to the body of water is at least 17 grams but less than 115 grams.

The invention may take the form of a pool product for maintaining a free chlorine level in a range of 0.5 ppm to 1.0 ppm in a pool wherein the pool is subject to a periodic bather load and the pH of the pool is maintained between 7.2 pH and 7.8 pH comprising: a first dispenser having a compartment containing a chlorinating agent for a placing in an outdoor pool; and a second dispenser having a compartment containing 5,5-dimethylhydantoin wherein a release of the chlorinating agent from the first dispenser increases the total chlorine to at least 3.0 ppm and a release of the 5, 5-dimethylhydantoin from the second dispenser in the pool lowers the free chlorine level between 0.5 ppm and 1.0 ppm. In this example the first dispenser containing the chlorination agent is placed in the body of water before the second dispenser containing the dimethylhydantoin is placed in the body of water.

The invention may take the form of a spa for absorbing a bather load without having to increase a free chlorine level in the body of water through addition of an additional chlorinating agent wherein the body of water: is between 65-105° F. with a pH in the range of 7.2 to 7.8; has an alkalinity in the range of 80 ppm to 120 ppm and a measured level of total chlorine comprising a dimethylhydantoin associated chlorine of at least 3.0 ppm and a measured level of free chlorine in a range of 0.5 ppm and 1.0 ppm after the body of water has been subjected to a combination of a chlorinating agent and dimethylhydantoin but before the body of water is subject to the bather load wherein the bather load absorbs the free chlorine in the body of water as the dimethylhydantoin converts the dimethylhydantoin associated chlorine to the free chlorine to thereby maintain the free chlorine in the range of 0.5 ppm to 1.0 ppm as long as the bather load chlorine demand does not exceed the dimethylhydantoin associated chlorine.

The invention may take the form of a free chlorine maintained system for absorbing a bather load without having to increase a free chlorine level in the body of water through addition of an additional chlorinating agent where the body of water has: a temperature that ranges from 60° F. to 120° F., a pH that ranges from 7.2 to 7.8; an alkalinity that ranges from 80 ppm to 120 ppm; a measured level of total chlorine comprising a dimethylhydantoin associated chlorine that is at least 3.0 ppm; and a free chlorine maintainer consisting of a chlorinating agent and dimethylhydantoin where a measured level of free chlorine ranges from 0.5 ppm to 1.0 ppm both before and after the body of water is subjected to the bather load and without addition of additional chlorine to the body of water. In this example the concentration of the dimethylhydantoin in the body of water ranges from 20 ppm to 200 ppm. Also, in this example the concentration of total chlorine in the body of water is at least 3.0 ppm.

The invention may take the form of a set of dispensing cartridges for placing in a back-to-back condition in an inline dispenser comprising: a first dispensing cartridge having a bottom inlet and a bottom outlet and containing a time dispensable chlorinating agent therein; and a second dispensing cartridge having a bottom inlet and a bottom outlet and an immediate dispensable DMH therein in sufficient amount to increase the concentration of DMH to a level that reduces a free chlorine level to a range 0.5 ppm to 1.0 ppm. In this example the set of dispensing cartridges may include a further dispensing cartridge containing an algaecide wherein the algaecide is dispensed into the body of water in response to a decrease of the free chlorine level to less than 0.5 ppm. Also in this example The set of dispensing cartridges contain sufficient chlorine to bring a total chlorine in the body of water in the range of 3-10 ppm.

The invention may take the form of a prepackaged free chlorine maintainer for use in a body of water that has been sanitized with a chlorinating agent to render the body of water safe for human immersion, the free chlorine maintainer including: a source of chlorine in solid form, the source of chlorine fully dissolvable in the body of water to bring the total chlorine level in the body of water to between 3 and 10 ppm; and a source of DMH in solid form, the source of DMH fully dissolvable in the body of water to bring the level of DMH in the body of water above 10 ppm while maintaining a level of free chlorine in the body of water between about 0.5 to 1.0 ppm.

In this example the invention may include a source of an algaecide in solid form, dissolvable in the body of water to kill existing algae and control algae growth in the body of water. In this example the prepackaged free chlorine maintainer may include a water dissolvable polyvinyl alcohol film housing encompassing the free chlorine maintainer. In this example the body of water may comprises an outdoor swimming pool. In this example the prepackaged free chlorine maintainer is used in body of waters that ranges between 10,000 to 15,000 gallons, between 4,000 to 6,000 gallons or between 100 to 600 gallons. In this example the body of water comprises a spa or hot tub.

The invention may take the form a prepackaged free chlorine maintainer for use in a body of water that has been sanitized with a chlorinating agent to render the body of water safe for human immersion, the free chlorine maintainer including a recharging dose of chlorine in solid form, the recharging dose of chlorine dissolvable in the body of water to bring the total chlorine level in the body of water to between 3 and 10 ppm; and a recharging dose of DMH in solid form, the recharging dose of DMH dissolvable in the body of water to bring the level of DMH in the body of water above 10 ppm.

The invention may take the form an outdoor swimming pool free chlorine maintaining dispenser for use in an outdoor swimming pool body of water that has been sanitized with a chlorinating agent to render the body of water safe for human immersion and subject to a periodic bather load and environmental conditions, the free chlorine maintaining dispenser including: a first housing having a water accessible compartment containing a chlorinating agent releasable into the body of water to maintain the total chlorine level in the body of water above 4 ppm; a second housing having a water accessible compartment containing a source of DMH dissolvable in the body of water to maintain the level of DMH in the body of water above 10 ppm while maintaining a level of free chlorine in the body of water between about 0.5 to 1.0 ppm. As an example the free chlorine maintaining dispenser may including a third housing having a water accessible compartment containing a source of an algaecide in solid form, the source of algaecide dissolvable in the body of water to kill existing algae and control algae growth in the body of water. As a further example the third housing may comprise a detachable third housing.

The invention may take the form a prepackaged free chlorine maintainer for use in a body of water that has been sanitized with a chlorinating agent to render the body of water safe for use as potable water, the free chlorine maintainer including: a source of chlorine in solid form, the source of chlorine fully dissolvable in the body of water to bring the total chlorine level in the body of water to between 3 and 10 ppm; and a source of DMH in solid form, the source of DMH fully dissolvable in the body of water to bring the level of DMH in the body of water above 10 ppm while maintaining a level of free chlorine between about 0.5 to 1.0 ppm.

The invention may take the form of a swimming pool free chlorine maintaining kit for use in an inline dispenser of a swimming pool body of water that has been sanitized with a chlorinating agent to render the body of water safe for human immersion and subject to a periodic bather load and environmental conditions, the swimming pool free chlorine maintaining kit including: a first dispensing cartridge having a bottom inlet and a bottom outlet and an immediate dispensable DMH therein in sufficient amount to bring a DMH level in the swimming pool body of water to at least 26 ppm and a second dispensing cartridge having a bottom inlet and a bottom outlet and containing a time dispensable chlorinating agent therein to bring the total chlorine level in a swimming pool body of water containing at least 26 ppm DMH to between 3.0 and 10 ppm total chlorine with the concentration of DMH maintaining a free chlorine level in the swimming pool body of water to a range 0.5 ppm to 1.0 ppm free chlorine. In this example the swimming pool free chlorine maintaining kit may include a third dispensing cartridge having a bottom inlet and a bottom outlet and containing a time dispensable combination chlorinating agent and algaecide, the combination chlorinating agent and algaecide dispensable into the swimming pool body of water in response to a decrease of the free chlorine level in the swimming pool body of water to less than 0.5 ppm free chlorine to kill existing algae and control algae growth in the body of water while bringing the total chlorine level in the swimming pool body of water back to between 3.0 and 10 ppm. Also as an example The swimming pool free chlorine maintaining kit may include a third dispensing cartridge having a bottom inlet and a bottom outlet and containing an immediate dispensable algaecide therein, the algaecide dispensable into the swimming pool body of water at the sign of algae growth to kill existing algae and control algae growth in swimming pool body of water. As a further example The swimming pool free chlorine maintaining kit may include a third dispensing cartridge having a bottom inlet and a bottom outlet and containing a time dispensable combination chlorinating agent and algaecide, the combination chlorinating agent and algaecide dispensable into the swimming pool body of water at the sign of algae growth to kill existing algae and control algae growth in the swimming pool body of water while bringing the total chlorine level in the swimming pool body of water back to between 3.0 and 10 ppm.

The invention may take the form of swimming pool water treatment system for use in an inline dispenser of a swimming pool body of water that has been sanitized with a chlorinating agent to render the body of water safe for human immersion and subject to a periodic bather load and environmental conditions, the swimming pool water treatment system including: a dispersal valve for directing water therethrough, the dispersal valve having an internal chamber; a first dispensing nestable canister having a bottom inlet and a bottom outlet and an immediate dispensable DMH therein in sufficient amount to bring a DMH level in the swimming pool body of water to at least 26 ppm; a second dispensing nestable canister having a bottom inlet and a bottom outlet and containing a time dispensable chlorinating agent therein to bring the total chlorine level in a swimming pool body of water containing at least 26 ppm DMH to between 3.0 and 10 ppm total chlorine with the concentration of DMH maintaining a free chlorine level in the swimming pool body of water to a range 0.5 ppm to 1.0 ppm free chlorine; and an annular dispensing nestable canister having a bottom inlet and a bottom outlet and containing water treatment minerals therein, the annular dispensing nestable canister having a chamber for nestably supporting the first dispensing nestable canister or the second dispensing nestable canister therein with the annular dispensing nestable canister and the dispensing nestable canister supported in the internal chamber of the dispersal valve to provide the dispersal valve with multiple water treatment dispersants for dispensing into a swimming pool body of water. As an example the swimming pool water treatment system may include a third dispensing nestable canister nestably supportable within the chamber of the annular dispensing nestable canister and having a bottom inlet and a bottom outlet and containing a combination time dispensable chlorinating agent and algaecide, the combination chlorinating agent and algaecide dispensable into the swimming pool body of water in response to a decrease of the free chlorine level in the swimming pool body of water to less than 0.5 ppm free chlorine to kill existing algae and control algae growth in the body of water while bringing the total chlorine level in the swimming pool body of water back to between 3.0 and 10 ppm. As a further example The swimming pool water treatment system may including a third dispensing nestable canister nestably supportable within the chamber of the annular dispensing nestable canister and having a bottom inlet and a bottom outlet and containing an immediate dispensable algaecide therein, the algaecide dispensable into the swimming pool body of water at the sign of algae growth to kill existing algae and control algae growth in swimming pool body of water. A further example of the swimming pool water treatment system may including a third dispensing nestable canister nestably supportable within the chamber of the annular dispensing nestable canister and having a bottom inlet and a bottom outlet and containing a combination time dispensable chlorinating agent and algaecide, the combination chlorinating agent and algaecide dispensable into the swimming pool body of water at the sign of algae growth to kill existing algae and control algae growth in the swimming pool body of water while bringing the total chlorine level in the swimming pool body of water back to between 3.0 and 10 ppm.

In the above evaluation wherever possible tests were conducted under field conditions as opposed to lab conditions in order ensure that the integrity of the results when the method and apparatus are used under field conditions.

We claim:

1. A prepackaged free chlorine maintainer for use in a body of water that has been sanitized with a chlorinating agent to render the body of water safe for human immersion, the free chlorine maintainer including:

a source of chlorine in solid form, said source of chlorine fully dissolvable in said body of water to bring the total chlorine level in the body of water to between 3 and 10 ppm; and a source of DMH in solid form, said source of DMH fully dissolvable in said body of water to bring the level of DMH in the body of water above 10 ppm while maintaining a level of free chlorine in the body of water between about 0.5 to 1.0 ppm.

2. The prepackaged free chlorine maintainer of claim 1 including a source of an algaecide in solid form, said source of algaecide dissolvable in said body of water to kill existing algae and control algae growth in said body of water.

3. The prepackaged free chlorine maintainer of claim 1 including a water dissolvable polyvinyl alcohol film housing encompassing said free chlorine maintainer.

4. The prepackaged free chlorine maintainer of claim 1 for use in a body of water that has been sanitized with a chlorinating agent to render the body of water safe for human immersion, the free chlorine maintainer including:

a recharging dose of chlorine in solid form, said recharging dose of chlorine dissolvable in said body of water to bring the total chlorine level in the body of water to between 3 and 10 ppm; and a recharging dose of DMH in solid form, said recharging dose of DMH dissolvable in said body of water to bring the level of DMH in the body of water above 10 ppm.

* * * * *